April 16, 1957 J. A. WRIGHT 2,788,762
APPARATUS FOR FRIGHTENING BIRDS
Filed June 4, 1954 2 Sheets-Sheet 1
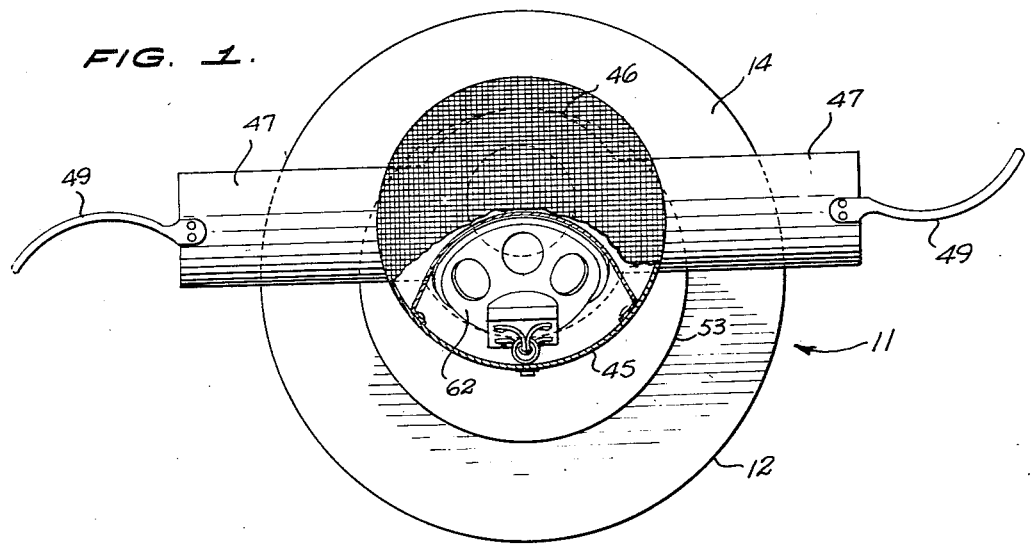
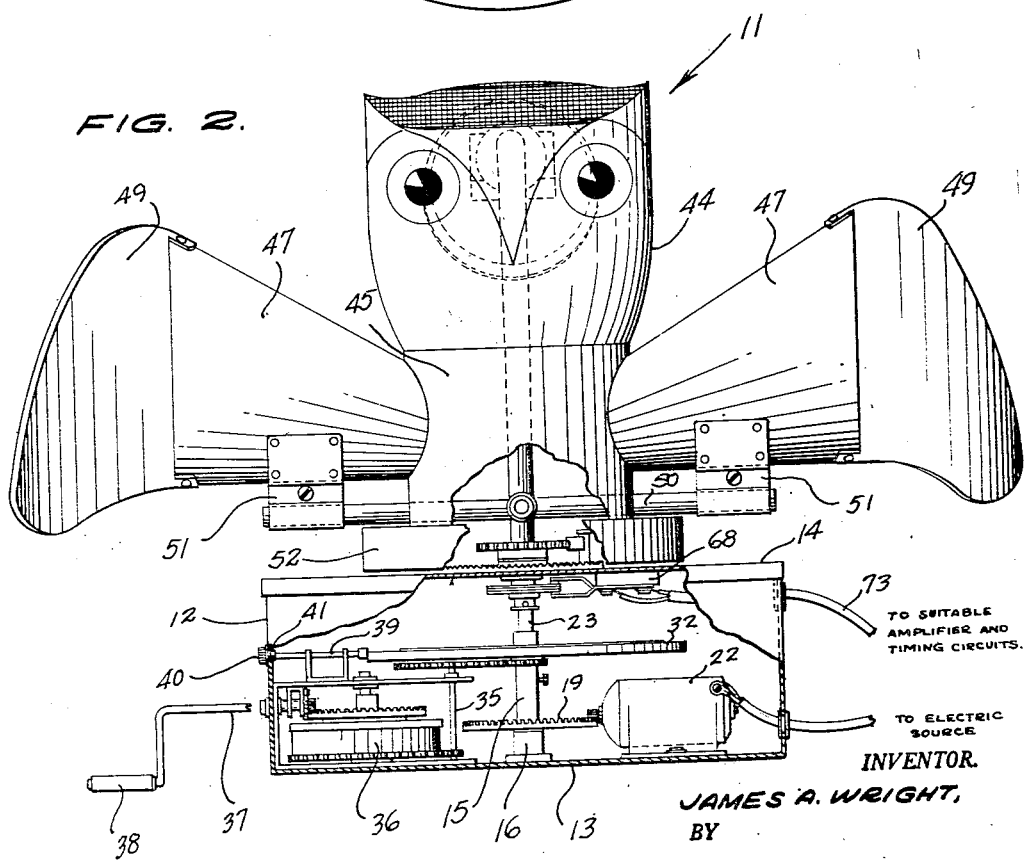
INVENTOR.
JAMES A. WRIGHT,
BY
McMorrow, Berman + Davidson
ATTORNEYS.

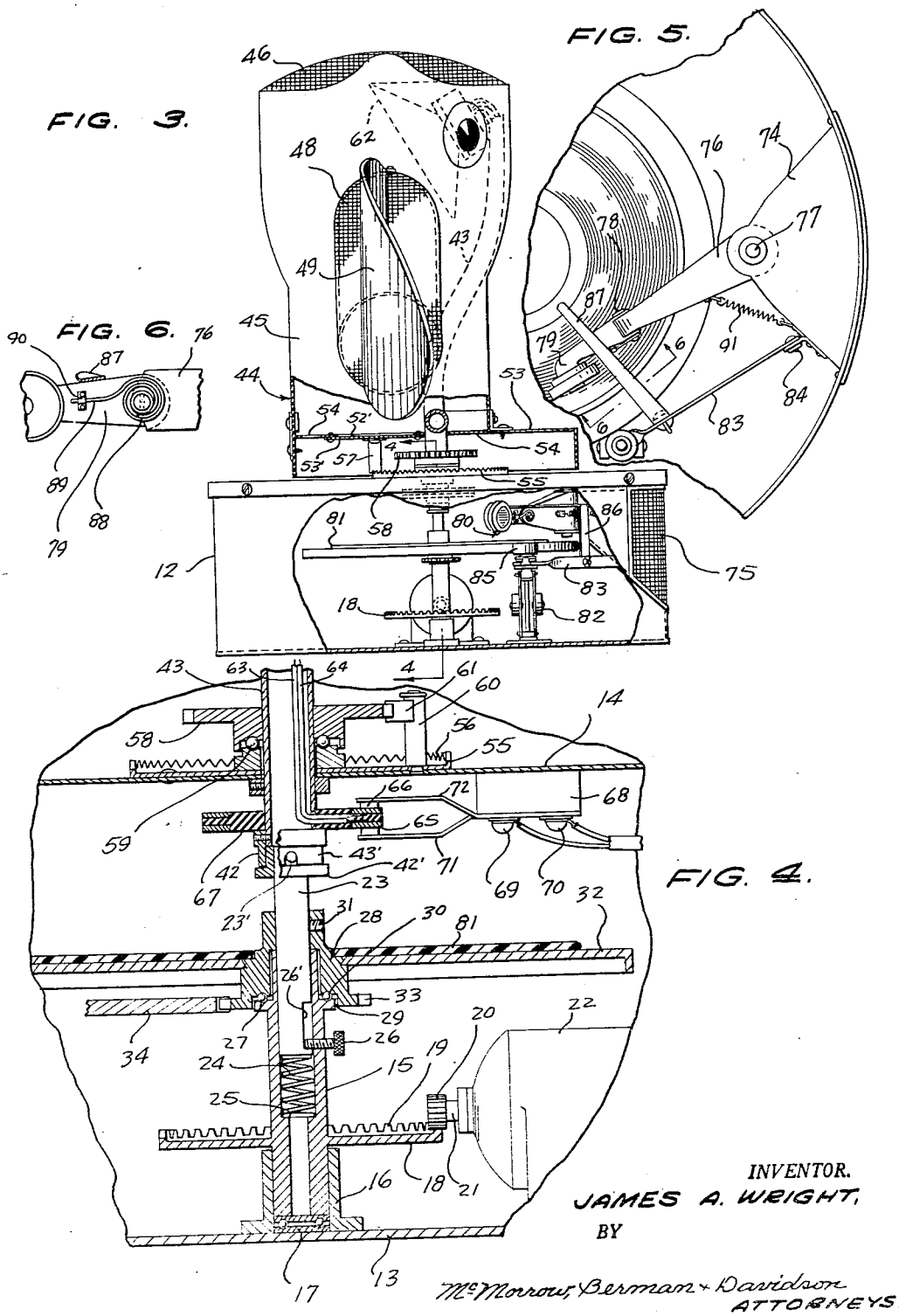

United States Patent Office 2,788,762
Patented Apr. 16, 1957

2,788,762

APPARATUS FOR FRIGHTENING BIRDS

James A. Wright, Washington, D. C.

Application June 4, 1954, Serial No. 434,372

5 Claims. (Cl. 116—22)

This invention relates to bird frightening devices, and more particularly to an improved device for keeping undesirable birds, such as starlings, pigeons and the like away from buildings and other structures.

A main object of the invention is to provide a novel and improved bird frightening device which is simple in construction, which is easy to install, and which is reliable in operation.

A further object of the invention is to provide an improved bird frightening device adapted to be employed on buildings or other structures for keeping undesirable birds, such as starlings, pigeons, and the like, away from the building or structure, the device involving inexpensive components, being durable in construction, and being arranged so that it may be operated either manually or electrically.

Further objects and advantages of the invention will become apparent from the following description and claims, and from the accompanying drawings, wherein:

Figure 1 is a top view of an improved bird frightening device constructed in accordance with the present invention.

Figure 2 is a front elevational view, partly broken away, of the bird frightening device illustrated in Figure 1.

Figure 3 is a side elevational view, partly broken away, of the bird frightening device shown in Figures 1 and 2.

Figure 4 is an enlarged vertical cross sectional view taken on the line 4—4 of Figure 3.

Figure 5 is an enlarged fragmentary top plan view of a portion of the phonograph turntable and the acoustic sound pickup arm and its sound chamber, as employed in the bird frightening device of Figures 1 to 4.

Figure 6 is a fragmentary cross sectional detail view taken on the line 6—6 of Figure 5.

Referring to the drawings, the bird frightening device is designated generally at 11 and comprises a base housing 12 which may be, for example, circular in shape, as shown in Figure 1, or which may have any other suitable shape. The base housing 12 is provided with the bottom wall 13 and the top cover 14 which is secured on the top rim of the housing 12.

Designated at 15 is a vertical sleeve member which is rotatably mounted centrally in the housing 12, the lower end of the sleeve member being journaled in a bearing bracket 16 secured to the bottom wall 13, said bearing bracket including the ball bearing unit 17 which rotatably supports the lower end of the sleeve member 15, as shown in Figure 4. Rigidly secured to the vertical sleeve member 15 is the gear disc 18, said gear disc being provided at its periphery with the upwardly projecting gear teeth 19 which are meshingly engaged by a pinion gear 20 carried on the end of the shaft 21 of an electric motor 22 mounted on the bottom wall 13 of the housing. Designated at 23 is a vertical shaft which is slidably engaged in the upper portion of the sleeve member 15, the lower end of said shaft being supported on a coiled spring 24 seated on an annular shoulder element 25 provided in the sleeve member 15, the shaft 23 being retained in the sleeve member 15 by means of a stop screw 26 threadedly engaged through the wall of the sleeve member and being engageable in a vertical recess 26' formed in the lower end portion of the shaft 23, as shown in Figure 4.

The upper portion of the sleeve member 15 is provided with the annular flange 27, and engaged on the top end of the sleeve member is a hub element 28 which is formed with an annular bearing recess 29 receiving the flange 27 and containing ball bearings 30, whereby the hub element 28 may be rotatably supported on the flange 27 for independent rotation relative to the sleeve element 15. The top portion of the hub member 28 is provided with a tapped radial bore 31 to receive screw 26 when shaft 23 is to be driven by a spring motor 36, as will be presently described. Thus, if it is desired to rotate the hub element 28 independently of the sleeve element 15, the screw 26 may be removed and placed in tapped bore 31, allowing the hub element 28 and shaft 23 to rotate relative to sleeve 15.

Secured concentrically on the hub element 28 is the phonograph turntable 32. The lower portion of the hub element 28 is formed with the integral gear 33 which is meshingly engaged by the large gear 34 secured on a vertical shaft 35 suitably journaled in and driven by a conventional clockwork mechanism 36. The mechanism 36 is wound up by means of a crank 37 projecting from the side wall of the housing 12 and being arranged so that the clockwork mechanism 36 may be readily wound up by grasping the handle 38 of the crank 37 with the crank 37 engaged in the chuck of the clockwork mechanism and by rotating the crank 37 in the usual manner. The turntable 32 may be locked against rotation by means of a conventional braking rod 39 which is provided with the external knob 40 and which is threadedly engaged through the side wall of the housing 12 at 41.

It will be readily understood that the turntable 32 may be released for rotation by the clockwork mechanism 36 by loosening the brake rod 39, namely, by retracting said rod by means of the knob 40.

Secured in the top end of shaft 23 is the transverse coupling pin 23' whose ends project laterally from a collar 42 secured on said top end of the shaft. Collar 42 is provided with the annular bottom flange 42'. The collar 42 is engageable in a depending skirt member 43' secured to the lower end of a vertical rigid tubular member 43 said skirt member being formed with diametrically opposed notches adapted to receive the end portions of the transverse coupling pin 23', as shown in Figure 4, to establish a driving connection between shaft 23 and tubular sleeve member 43. Secured to the sleeve member 43 is a sound chamber designated generally at 44, said sound chamber comprising a hollow upstanding central portion 45 open at its top end, and provided with the top screen 46. The sound chamber 44 also includes the oppositely extending, open-ended, outwardly flaring hollow arm portions 47, 47, said arm portions communicating with the upstanding central chamber portion 45. The outer ends of the arm portions 47, 47 are provided with suitable cover screens 48, and have secured thereto the curved rigid flap member 49, said flap members 49 being oppositely curved, as is clearly shown in Figure 1.

As shown in Figure 2, the sound chamber 44 may be suitably decorated and shaped to simulate generally the appearance of an owl or similar bird of prey to enhance the effectiveness of the device.

Rigidly secured to the lower portion of the upstanding tubular support member 43 is the transversely extending horizontal tubular support member 50. The outer ends of the support member 50 are secured by brace elements 51 to the intermediate lower portions of the outwardly extending hollow arm portions 47, 47, to rigidly brace said hollow arm portions against wind and other forces.

The sound chamber 44 is mounted on a circular bottom skirt member 52 which is arranged concentrically with the top cover member 14 of base housing 12 and which is spaced sufficiently above the top surface of the cover member 14 to be freely rotatable with respect thereto.

The skirt member 52 is provided with a top wall 53 which is apertured at 54, namely, within the upstanding hollow central portion 45, whereby moisture may drain from said upstanding central portion.

Secured on the top wall 14 concentric with the lower portion of the tubular member 43 is the circular disc 55 provided at its periphery with the upstanding serrations or teeth 56. Secured to the top wall 53 of the circular skirt member 52 around an aperture 52' therein is a resonant sounding element or disc 53' to which is secured a depending element or leaf spring 57 whose lower end engages the serrations 56, whereby the leaf spring 57 and disc 53' are violently vibrated responsive to the rotation of the sound chamber 44, producing a loud and harsh sound. Secured to the tubular member 43 above the plate 55 is the serrated disc 58, said disc being journaled on the hub portion of the circular plate member 55 by means of ball bearings 59, as shown in Figure 4, defining a supporting bearing unit for the tubular support member 43. Designated at 60 is an upstanding post member secured to the cover member 14, said post member 60 having secured thereto the leaf spring 61 which engages the toothed periphery of the gear member 58 to prevent excessive backlash of the sound chamber. Also, rotation of the sound chamber 44 causes the leaf spring 61 to be vibrated simultaneously with the vibration of the leaf spring 57, creating an additional loud and harsh noise which is transmitted to the sound chamber 44.

Mounted on the top end portion of the tubular support member 43, adjacent the top end of the main upstanding central portion 45 of the sound chamber is a loud speaker 62. The loud speaker 62 is provided with lead wires 63, 64 which extend downwardly through the tubular support member 43 and which are connected respectively to annular slip rings 65, 66 carried on an insulating disc 67 secured to the lower end portion of the tubular support member 43. A terminal bracket 68 is secured to the cover member 14 and is provided with the respective terminals 69 and 70 to which are connected the respective brush elements 71 and 72. The brush element 71 underlies and engages the slip ring 65 and the brush element 72 overlies and engages the slip ring 66, whereby the lead wires 63 and 64 are respectively connected electrically to the terminals 69 and 70.

The terminals 69 and 70 are connected by an external cable 73 to a suitable amplifier which is supplied by a suitable signal source. The signal source may be of any suitable type arranged to provide a sound signal effective for frightening birds, said source being preferably arranged to provide timed intermittent bursts of sound to create a startling effect adapted to disturb roosting birds and frighten the birds away from the structure on which the device is installed.

Mounted in the base housing 12 is the outwardly flaring sound chamber 74 which is open at the side wall of the housing 12 and which is provided with the protective screen 75. Designated at 76 is the acoustic arm which is pivoted at 77 to the end of the sound chamber 74 and which is in acoustic communication therewith. Pivoted at 78 to the acoustic arm 76 is the pickup element 79 which is provided with a stylus 80, said pickup element being arranged over the turntable 32 and the stylus 80 being engageable in the grooves of a record 81 mounted on the turntable, as shown in Figure 3. The record disc 81 may be provided with a suitable recording of startling noises suitable for frightening birds.

The speed of rotation of the turntable 32 is controlled by conventional governor means 82 supported by a bracket bar 83 pivotally secured to the sound chamber 74 at 84. The governor 82 is provided with the brake wheel 85 which is engageable with the rim of the turntable 32 and which functions in the usual manner to regulate the speed of the turntable.

Secured to the arm 83 is the upstanding bracket member 86 formed with the top horizontal arm 87 which overlies the pickup arm 79 and moves the stylus 80 downwardly into contact with the grooves of the record 81 responsive to rotation of the governor 82. The arm 87 is substantially resilient but the downward movement thereof is sufficient to overcome the upward force exerted on the pickup arm 79 by a spirally coiled spring 88 located at the horizontal pivotal connection 78, the spring 88 having its inner end anchored to the end of the acoustic arm 76 and having its outer end 89 secured to the pickup arm 79, as by a fastening bracket 90, shown in Figure 6.

A coiled spring 91 connects the intermediate portion of the acoustic arm 76 to the side wall of the sound chamber 74, as shown in Figure 5, and exerts a spring biasing force on the acoustic arm 76 to cause the return of acoustic arm 76 to its starting position after rotation of the governor 82 is terminated.

In operation, the turntable 32 and the sound chamber 44 may be simultaneously rotated by means of the clockwork mechanism 36 and motor 22 after said mechanism has been suitably wound up by means of the winding crank 37, and after the brake rod 39 has been retracted in the manner above described. As above explained, turntable 32 and sound chamber 44 may be rotated by spring motor 36 alone by employing the screw 26 in the tapped bore 31.

The record 81 may be inserted by depressing shaft 23, as by grasping flange 42' and exerting downward force thereon, to disengage pin 23 from the notches in member 43'. This allows the record 81 to be slipped over the top end of shaft 23 and collar 42 and to be seated on turntable 32 in the manner shown in Figure 4. The shaft 23 may be then released, whereby spring 24 moves the shaft upwardly to allow the end portions of pin 23' to be engaged in the notches in skirt member 43'.

It will be understood that when the sound chamber 44 rotates, the sound record on the phonograph disc 81 is picked up by the acoustic pickup member 79 and transmitted to the acoustic arm 76 to the sound chamber 74, whereby the amplified sound is emitted from the side of the base member 12. Simultaneously, sound is generated by the vibration of the leaf springs 57 and 61 and is transmitted upwardly into and through the sound chamber 44, the sound being emitted from the top end of the central upstanding main portion 45 and from the horn elements 47, 47 extending laterally from said main portion 45. Simultaneously with the sound, the sound chamber 44 rotates, whereby the outwardly extending vanes 49, 49 create a considerable amount of turbulence in the air around the device, adding to the startling effect produced by the various sounds emitted from the device. The vanes 49, 49 also serve as wind vanes, whereby the device may be driven by wind action at times, instead of being driven by either the electric motor 22 or the spring motor 36.

Simultaneously with the above actions, the loud speaker 62 is energized from its source of electrical sound signals, and produces further disturbing sounds, thus intensifying the action of the device.

While a specific embodiment of an improved bird frightening device has been disclosed in the foregoing description it will be understood that various modifications within the spirit of the invention may occur to those skilled in the art. Therefore, it is intended that no limitations be placed on the invention except as defined by the scope of the appended claims.

What is claimed is:

1. Apparatus for frightening birds comprising a housing including a bottom wall and a top cover, a vertical sleeve member positioned within said housing and having the portion adjacent the lower end supported on said bottom wall and having the upper end spaced below said top cover, a rotatable vertical shaft supported in said sleeve member and having the portion adjacent the upper end exteriorly of the upper end of said sleeve member and spaced below said top cover, a vertical tubular member extending through said top cover and having the lower end drivingly connected to said shaft upper end portion and having the portion adjacent the upper end exteriorly of and spaced above said top cover, a sound chamber including a hollow upstanding central portion open at its top secured to said tubular member upper end portion, a resonant sounding element fixedly positioned within said sound chamber, and a resilient element depending from said sounding element and engageable with means on said top cover upon rotation of said sound chamber to produce loud and harsh sounds.

2. Apparatus for frightening birds comprising a housing including a bottom wall and a top cover, a vertical sleeve member positioned within said housing and having the portion adjacent the lower end supported on said bottom wall and having the upper end spaced below said top cover, a rotatable vertical shaft supported in said sleeve member and having the portion adjacent the upper end exteriorly of the upper end of said sleeve member and spaced below said top cover, a vertical tubular member extending through said top cover and having the lower end drivingly connected to said shaft upper end portion and having the portion adjacent the upper end exteriorly of and spaced above said top cover, a phonograph turntable circumposed about said shaft upper end portion and rotatably supported on said sleeve member, means operatively connected to said turntable for rotating the latter, another sound chamber within said housing intermediate the bottom wall and top cover, an acoustic sound pick-up arm within said another chamber for engaging a sound record on said phonograph turntable, a sound chamber including a hollow upstanding central portion open at its top secured to said tubular member upper end portion, a resonant sounding element fixedly positioned within said sound chamber, and a resilient element depending from said sounding element and engageable with means on said top cover upon rotation of said sound chamber to produce loud and harsh sounds.

3. Apparatus for frightening birds comprising a housing including a bottom wall and a top cover, a vertical sleeve member positioned within said housing and having the portion adjacent the lower end supported on said bottom wall and having the upper end spaced below said top cover, a rotatable vertical shaft supported in said sleeve member and having the portion adjacent the upper end exteriorly of the upper end of said sleeve member and spaced below said top cover, a vertical tubular member extending through said top cover and having the lower end drivingly connected to said shaft upper end portion and having the portion adjacent the upper end exteriorly of and spaced above said top cover, a sound chamber including a hollow upstanding central portion open at its top secured to said tubular member upper end portion, a flap member on each side of said hollow central portion and carried by said portion, a resonant sounding element fixedly positioned within said sound chamber, and a resilient element depending from said sounding element and engageable with means on said top cover upon rotation of said sound chamber to produce loud and harsh sounds.

4. Apparatus for frightening birds comprising a housing including a bottom wall and a top cover, a vertical sleeve member positioned within said housing and having the portion adjacent the lower end rotatably supported on said bottom wall and having the upper end spaced below said top cover, a rotatable vertical shaft supported in said sleeve member and having the portion adjacent the upper end exteriorly of the upper end of said sleeve member and spaced below said top cover, means connecting said shaft to said sleeve member for rotation with the latter, a vertical tubular member extending through said top cover and having the lower end drivingly connected to said shaft upper end portion and having the portion adjacent the upper end exteriorly of and spaced above said top cover, a sound chamber including a hollow upstanding central portion open at its top secured to said tubular member upper end portion, a resonant sounding element fixedly positioned within said sound chamber, and a resilient element depending from said sounding element and engageable with means on said top cover upon rotation of said chamber to produce loud and harsh sounds.

5. Apparatus for frightening birds comprising a housing including a bottom wall and a top cover, a vertical sleeve member positioned within said housing and having the portion adjacent the lower end supported on said bottom wall and having the upper end spaced below said top cover, a rotatable vertical shaft supported in said sleeve member and having the portion adjacent the upper end exteriorly of the upper end of said sleeve member and spaced below said top cover, a vertical tubular member extending through said top cover and having the lower end drivingly connected to said shaft upper end portion and having the portion adjacent the upper end exteriorly of and spaced above said top cover, a sound chamber including a hollow upstanding central portion open at its top secured to said tubular member upper end portion, an outwardly flaring hollow arm portion projecting from each side of said hollow central portion, a flap member carried by each of said arm portions, a resonant sounding element fixedly positioned within said sound chamber, and a resilient element depending from said sounding element and engageable with means on said top cover upon rotation of said sound chamber to produce loud and harsh sounds.

References Cited in the file of this patent

UNITED STATES PATENTS

| | | |
|---|---|---|
| 754,825 | Spencer et al. | Mar. 15, 1904 |
| 1,131,895 | Balcke | Mar. 16, 1915 |
| 1,542,542 | Echevarria | June 16, 1925 |
| 1,778,693 | Sample | Oct. 14, 1930 |
| 2,270,142 | Robinson et al. | Jan. 13, 1942 |
| 2,367,026 | Hutter | Jan. 9, 1945 |
| 2,532,835 | Cohn | Dec. 5, 1950 |
| 2,555,800 | Levine | June 5, 1951 |
| 2,596,678 | Gross | May 13, 1952 |

FOREIGN PATENTS

| | | |
|---|---|---|
| 822,220 | France | Sept. 13, 1937 |